(12) United States Patent
Jang

(10) Patent No.: US 12,053,087 B2
(45) Date of Patent: Aug. 6, 2024

(54) PROTECTOR FOR INSTALLATION ON FLOOR

(71) Applicant: Jae Hyung Jang, Seoul (KR)

(72) Inventor: Jae Hyung Jang, Seoul (KR)

( * ) Notice: Subject to any disclaimer, the term of this patent is extended or adjusted under 35 U.S.C. 154(b) by 620 days.

(21) Appl. No.: 17/418,553

(22) PCT Filed: Jan. 14, 2019

(86) PCT No.: PCT/KR2019/000531
§ 371 (c)(1),
(2) Date: Jun. 25, 2021

(87) PCT Pub. No.: WO2020/145446
PCT Pub. Date: Jul. 16, 2020

(65) Prior Publication Data
US 2022/0071393 A1    Mar. 10, 2022

(30) Foreign Application Priority Data
Jan. 9, 2019    (KR) .................. 10-2019-0002997

(51) Int. Cl.
*A47B 91/08*    (2006.01)
*A47B 91/00*    (2006.01)
(Continued)

(52) U.S. Cl.
CPC .............. *A47B 91/08* (2013.01); *A47B 91/00* (2013.01); *A47B 47/027* (2013.01); *A47B 91/02* (2013.01); *A47B 91/12* (2013.01)

(58) Field of Classification Search
CPC ......... A47B 91/08; A47B 91/00; A47B 91/04; A47B 91/12; A47B 47/00; A47B 47/0008;
(Continued)

(56) References Cited

U.S. PATENT DOCUMENTS 2,110,005 A * 3/1938 Rees .................. F24C 15/08
16/42 R
3,206,235 A * 9/1965 091965 .................. A47C 7/002
343/882

(Continued)

FOREIGN PATENT DOCUMENTS

EP    2565134    3/2013
KR    101296162    8/2013

*Primary Examiner* — Devin K Barnett
(74) *Attorney, Agent, or Firm* — IPLA P.A.

(57) ABSTRACT

A protector for installation on a floor includes: a guard part comprising a contact surface portion having first screw through-holes formed therethrough, a middle portion which is coupled upward from the edge of the contact surface portion to be primarily impacted, and wing portions integrally coupled to both sides of the middle portion, respectively; a base part having third screw through-holes formed therethrough so as to be fixed to a floor surface while being brought into contact with the floor surface; an intermediate body disposed between the guard part and the base part and having second screw through-holes formed therethrough; and stud bolts passing through the guard part, the intermediate body, and the base part so as to fix the base part to the floor surface, wherein when an external force is applied, the elastic and flexible intermediate body is compressed in a collision direction to effectively reduce the impact.

5 Claims, 2 Drawing Sheets

(51) Int. Cl.
  *A47B 47/02* (2006.01)
  *A47B 91/02* (2006.01)
  *A47B 91/12* (2006.01)
(58) Field of Classification Search
  CPC ... A47B 47/0083; A47B 47/02; A47B 47/021; A47B 47/027; A47B 96/06; A47B 96/068; A47B 96/14; A47B 96/1433; A47B 91/02
  See application file for complete search history.

(56) References Cited

U.S. PATENT DOCUMENTS

| | | | | |
|---|---|---|---|---|
| 3,372,552 | A * | 3/1968 | 031968 | E02B 3/26 405/215 |
| 4,076,202 | A * | 2/1978 | McConnell | A47B 91/12 248/188.9 |
| 4,826,117 | A * | 5/1989 | Bastian | A47B 91/10 248/501 |
| 4,838,440 | A * | 6/1989 | Thompson | A47B 13/021 248/188 |
| 5,369,925 | A * | 12/1994 | Vargo | E04H 12/2292 211/183 |
| 5,622,356 | A * | 4/1997 | Duggan | E04H 12/2292 52/170 |
| 5,832,675 | A * | 11/1998 | Zuares | E04H 12/2292 52/60 |
| 6,242,070 | B1 * | 6/2001 | Gillispie | E01F 15/141 428/122 |
| 6,257,557 | B1 * | 7/2001 | Anderson | E04H 12/2292 256/65.14 |
| 6,332,549 | B1 * | 12/2001 | MacDonald | A47B 47/027 211/183 |
| 6,336,620 | B1 * | 1/2002 | Belli | E04F 11/1812 248/519 |
| 6,405,884 | B1 * | 6/2002 | Dion | A47B 47/02 211/183 |
| 6,591,579 | B2 * | 7/2003 | Sekulla | E04F 21/22 52/750 |
| 6,609,620 | B1 * | 8/2003 | Kautz | E01F 15/141 211/183 |
| 7,104,525 | B2 * | 9/2006 | Ricci | E04H 12/2292 47/32.4 |
| D610,718 | S * | 2/2010 | Ringus | D25/133 |
| 7,694,720 | B2 * | 4/2010 | Shen | H01L 23/3672 361/710 |
| 7,722,014 | B2 * | 5/2010 | Godwin | E04H 12/2261 52/297 |
| 7,748,546 | B2 * | 7/2010 | Konstant | A47B 47/021 52/693 |
| 9,737,143 | B2 * | 8/2017 | Ramon | B65G 1/02 |
| 9,752,291 | B2 * | 9/2017 | Michael | E01F 15/141 |
| 10,457,481 | B2 * | 10/2019 | Medina Casado | A47B 95/043 |
| 2003/0217526 | A1 * | 11/2003 | Larson | E04C 3/30 52/835 |
| 2004/0094496 | A1 * | 5/2004 | MacDonald | B65G 1/02 211/183 |
| 2004/0155003 | A1 * | 8/2004 | Anderson | B65G 1/02 211/183 |
| 2005/0087664 | A1 * | 4/2005 | Ciarlo | B65G 1/02 248/345.1 |
| 2007/0170137 | A1 * | 7/2007 | Thelwell | B65G 1/02 211/183 |
| 2007/0221596 | A1 * | 9/2007 | Rioux | B65G 1/02 211/191 |
| 2008/0029676 | A1 * | 2/2008 | Huxtable | F16F 7/00 248/345.1 |
| 2008/0083686 | A1 * | 4/2008 | Jones | B65G 1/02 211/191 |
| 2008/0149581 | A1 * | 6/2008 | Clarke | A47B 95/043 211/183 |

* cited by examiner

[Fig. 1]
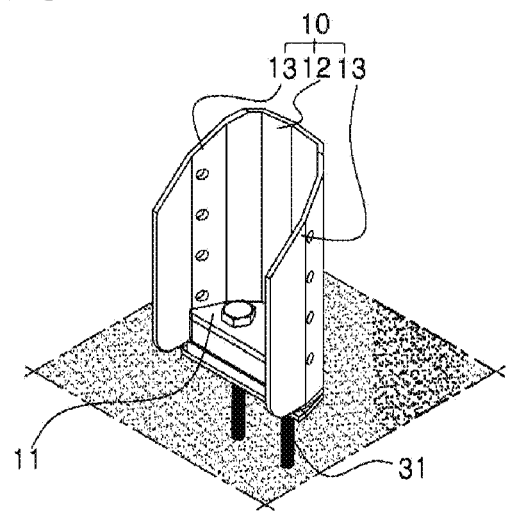
[Fig. 2]
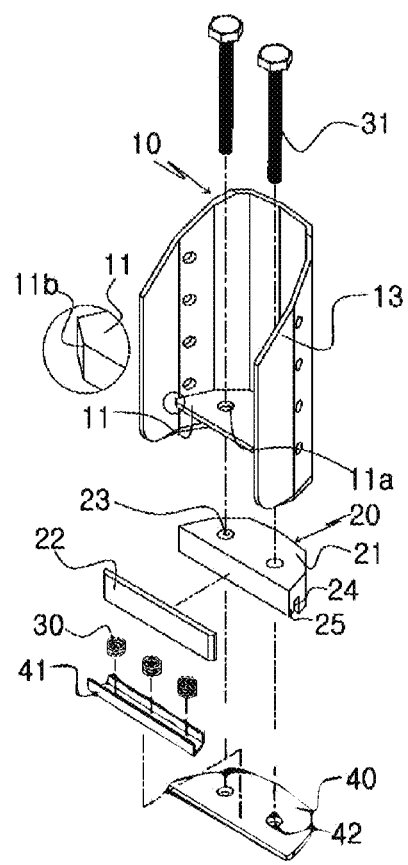

[Fig. 3]
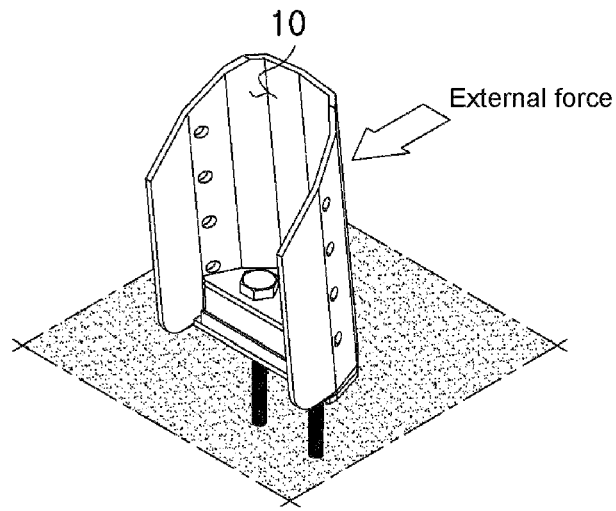
[Fig. 4]
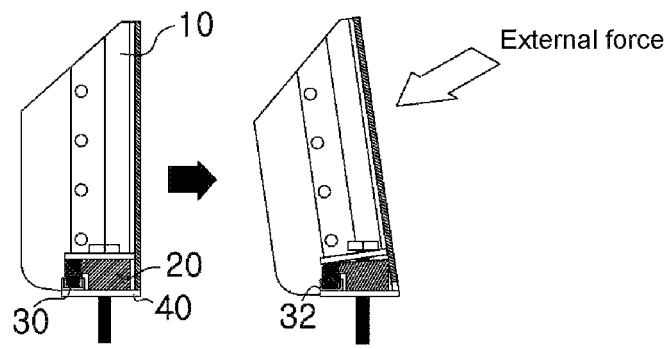
[Fig. 5]
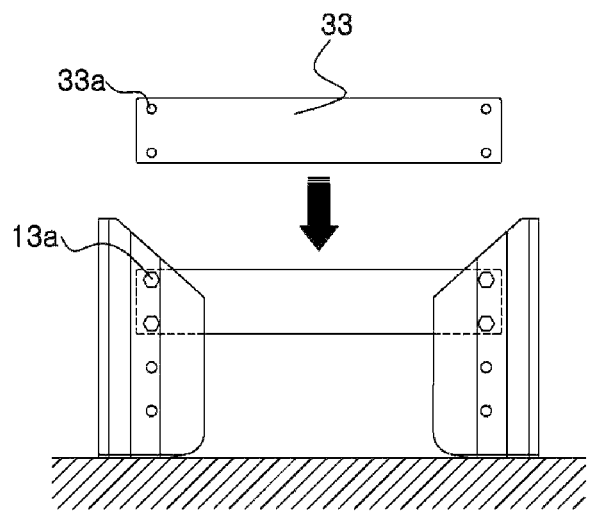

PROTECTOR FOR INSTALLATION ON FLOOR

BACKGROUND

The present invention relates to a guard for installation on a floor, and more particularly, to a protector for installation on a floor, which comprises a guard part, an intermediate body, and an elastic body capable of being compressed according to a degree of impact on the bottom surface of the intermediate body so as to absorb or reduce the impact when receiving an external force and may be installed on a floor surface.

In general, an iron shelf or rack used in an industrial site consists of vertical posts installed on the ground at predetermined intervals, and horizontal shelves are fixed in a vertical direction to the vertical posts at predetermined intervals to form multilayered shelves, and products are loaded on the upper surface of each shelf. In order to load products having various weights on the shelf, a pallet, a forklift capable of carrying the pallet, etc. have been used, and sometimes, there is a case where the forklift that carries the pallet collides with the vertical post of the iron shelf due to a difficulty of securing a front view. In this case, due to the collision impact, a safety accident in which the vertical post was damaged or broken occurred. In this regard, in order to prevent the collision, an alarm rod, etc. are installed on a front surface portion of the shelf to make an effort to call a user's attention of the forklift, etc. and limit an approach radius of the shelf. In Korean Patent Application No. 10-2013-0043142, there is provided a rack post protecting device which includes a cover in which a cutout portion corresponding to a width of the rack post is provided in a longitudinal direction of a pipe type body and a filing material filled through a hollow of the cover so as to reduce the impact during collision.

However, in order to prevent the impact, additionally, a protector installed on the floor surface in the industrial site has been required.

Therefore, the present invention is intended to provide a protector for installation on a floor which comprises a guard part; a base part; an intermediate body between the guard part and the base part; two or more elastic bodies installed between the intermediate body and the base part; and stud bolts capable of fixing the base part to the floor surface by passing through the guard part, the intermediate body, and the base part to be compressed in a collision direction during collision, thereby calling a driver's attention while reducing the impact.

SUMMARY OF THE INVENTION

The present invention relates to a guard for installation on a floor, and an object of the present invention is to provide a protector for installation on a floor capable of effectively absorbing the impact when receiving an external force such as collision or the like.

An aspect of the present invention to solve the problem provides a protector for installation on a floor which comprises a guard part; a base part; an intermediate body between the guard part and the base part; two or more elastic bodies installed between the intermediate body and the base part; and stud bolts capable of fixing the base part to the floor surface by passing through the guard part, the intermediate body, and the base part.

The present invention relates to a guard for installation on a floor, and in order to effectively absorb the impact, the protector for installation on the floor comprises a guard part; a base part; an intermediate body between the guard part and the base part; two or more elastic bodies installed between the intermediate body and the base part; and stud bolts capable of fixing the base part to the floor surface by passing through the guard part, the intermediate body, and the base part. A rear surface portion coupled to a body part which is a first component of the intermediate body is made of a softer material than the body part and simultaneously, the elastic body and the soft intermediate body are compressed in a collision direction when applying an external force due to the coupling of the elastic body. Therefore, there is an advantaged of effectively reducing the impact.

BRIEF DESCRIPTION OF DRAWINGS

FIG. 1 is an overall perspective view of a guard for installation on a floor.

FIG. 2 is a detailed exploded view of the guard for installation on the floor.

FIG. 3 is a perspective view of the guard for installation on the floor which is compressed by receiving an external force.

FIG. 4 is a detailed cross-sectional view of the guard for installation on the floor which is compressed by receiving the external force.

FIG. 5 is an exemplary view of the guards for installation on the floor which are coupled to each other.

DETAILED DESCRIPTION OF THE INVENTION

Hereinafter, the present invention will be described in more detail with reference to the accompanying drawings.

Before this, terms and words used in this specification and claims should not be interpreted as being limited to typical or dictionary meanings, but should be interpreted as having meanings and concepts which comply with the technical spirit of the present invention, based on the principle that inventors can appropriately define the concept of the term to describe their own invention in the best manner.

Accordingly, configurations illustrated in the drawings and embodiments disclosed in the present specification are only the most preferred embodiment of the present invention and do not represent all of the technical spirit of the present invention, and thus it is to be understood that various equivalents and modifications, which may replace the configurations, are possible when filing the present application.

The present invention relates to a protector for installation on a floor, and the protector for installation on the floor greatly comprises a guard part 10 to which impact is primarily applied; a base part 40 which is in contact with the floor surface; an intermediate body 20 between the guard part 10 and the base part 40; two or more elastic bodies 30 installed between the intermediate body 20 and the base part 40; and stud bolts 31 capable of fixing the base part to the floor surface by passing through the guard part 10, the intermediate body 20, and the base part 40.

More specifically, the guard part 10 comprises a contact surface portion 11 having rear surface chamfer portions 11b formed on both sides of the rear surface; a middle portion 12 coupled upward from an edge of the contact surface portion 11; wing portions 13 integrally coupled to both sides of the middle portion; first screw through-holes 11a formed through the contact surface portion 11; and at least one fastening hole 13a.

The intermediate body 20 comprises a body portion 21 formed in the same shape as the contact surface portion of the guard part 10; a rear surface portion 22 coupled to a rear surface of the body portion; second screw through-holes 23 formed through the body portion 21 so as to communicate with the first screw through-holes 11a; a upward recessed portion 24 formed on a lower surface of the body portion to be recessed upward from the lower surface; and a downward protrusion portion 25 which protrudes downward by the upward recessed portion and is shorter than the entire height of the body portion. The rear surface portion 22 and the body portion are coupled to each other and formed in the same shape as the rear surface chamfer portion 11b of the contact surface portion, and particularly, the rear surface portion 22 is made of a softer material than the body portion 21 to soften the impact absorption.

Further, the base part 40 comprises third screw through-holes 42 communicating with the first and second screw through-holes 11a and 23; and a top-opened type insertion plate 41 coupled to the base part 40. The downward protrusion portion 25 and the rear surface portion 22 are inserted through the top surface portion of the C-type insertion plate. Since the lengths of the downward protrusion portion and the rear surface portion are shorter than the height length of the body portion, when the downward protrusion portion 25 and the rear surface portion 22 are inserted to the insertion plate, a space portion 32 is formed according a difference in height and two or more elastic bodies 30 are installed in the space portion.

In addition, the stud bolts 31 may fix the base part 40, the intermediate body 20, and the guard part 10 to the floor surface through the first, second, and third screw through-holes 11a, 23, and 42.

Further, a connection bar having connection holes formed therethrough is provided to couple two protectors.

As an embodiment, since the body portion 21 and the rear surface portion 22 of the intermediate body 20 are made of a soft material and the guard part 10 is fixed and coupled to the upper surface thereof, when the guard part receives the external force, the soft body part moves in an external force direction to reduce the impact. The rear surface portion 22 in contact with the insertion plate 41 is made of a softer material than the body portion to absorb the impact. As illustrated in FIG. 4, the downward protrusion portion 25, the rear surface portion 22, and the elastic body installed in the space portion of the insertion plate 41 are compressed to maximize the impact reduction.

Further, when the chamfered portion of the rear surface portion formed in the same shape as the rear surface chamfer portion of the contact surface portion is impacted, a volume to be compressed is reduced. Furthermore, the rear surface portion is formed of the softer material than the body portion to further improve compressibility, thereby effectively absorbing the impact.

Further, as illustrated in FIG. 5, it is possible to connect the guard parts of the two protectors by using the fastening holes of the guard part and the connection bar having the connection holes formed therethrough.

As described above, the present invention has been described by specified matters such as detailed components, and the like and limited embodiments and drawings, but the description is just provided to assist more overall understanding of the present invention and the present invention is not limited to the embodiment and various modifications and changes can be made by those skilled in the art from such a disclosure.

Therefore, the spirit of the present invention should not be defined only by the described embodiments, and it should be appreciated that claims to be described below and all which are equivalent to the claims or equivalently modified to the claims are included in the scope of the spirit of the present invention.

The invention claimed is:

1. A protector for installation on a floor comprising:
   a guard part comprising a contact surface portion having first screw through-holes formed therethrough, a middle portion which is coupled upward from an edge of the contact surface portion to be primarily impacted, and wing portions integrally coupled to both sides of the middle portion, respectively, wherein the contact surface has a cross section shape;
   a base part having third screw through-holes formed therethrough, the base part is configured to be fixed to a floor surface while being brought into contact with the floor surface;
   an intermediate body disposed between the guard part and the base part and having second screw through-holes formed therethrough; and
   stud bolts extending through the guard part, the intermediate body, and the base part to fix the base part to the floor surface;
   wherein the intermediate body comprises a body portion formed in that has a height and a cross section shape that is the same shape as the cross section shape of the contact surface portion of the guard part; a rear surface portion coupled to a rear surface of the body portion; an upward recessed portion formed on a lower surface of the body portion to be recessed upward from the lower surface, and a downward protrusion portion that is adjacent to the upward recessed portion, wherein the downward protrusion portion which protrudes downward from an upper portion of body portion, wherein the downward protrusion portion the upward recessed portion and is shorter than the entire height of the body portion, wherein the rear surface portion has a and the body portion are coupled to each other and formed in the same shape that corresponds to a shape of a rear surface chamfer portion of the contact surface portion, and particularly, wherein the rear surface portion is made of a softer material than the body portion.

2. The protector for installation on the floor of claim 1, further comprising:
   an insertion plate formed on the upper surface of the base part so that the downward protrusion portion and the rear surface portion of the intermediate body are configured to be inserted therein.

3. The protector for installation on the floor of claim 2, further comprising:
   a space portion formed due to a difference in length when the downward protrusion portion and the rear surface portion of the intermediate body are inserted through an opened surface of the insertion plate; and at least one elastic body in the space portion.

4. The protector for installation on the floor of claim 1, further comprising:
   rear surface chamfer portions formed on both sides of the contact surface portion.

5. The protector for installation on the floor of claim 1, further comprising:

a connection bar having connection holes formed therethrough; and fastening holes formed through the guard part.

\* \* \* \* \*